March 28, 1967     H. ZARM     3,311,379
RECORD CHANGING COUPLING FOR A PHONOGRAPH Filed May 15, 1964     6 Sheets-Sheet 1

INVENTOR
HORST ZARM

March 28, 1967 H. ZARM 3,311,379
RECORD CHANGING COUPLING FOR A PHONOGRAPH
Filed May 15, 1964 6 Sheets-Sheet 3

INVENTOR.
HORST ZARM
BY
AGENT

March 28, 1967   H. ZARM   3,311,379
RECORD CHANGING COUPLING FOR A PHONOGRAPH
Filed May 15, 1964   6 Sheets-Sheet 4

INVENTOR.
HORST ZARM
BY
Frank R. Trifari
AGENT

March 28, 1967 H. ZARM 3,311,379
RECORD CHANGING COUPLING FOR A PHONOGRAPH
Filed May 15, 1964 6 Sheets-Sheet 6

INVENTOR.
HORST ZARM
BY
AGENT

United States Patent Office 3,311,379
Patented Mar. 28, 1967

3,311,379
RECORD CHANGING COUPLING FOR
A PHONOGRAPH
Horst Zarm, Berlin-Zehlendorf, Germany, assignor to
North American Philips Company, Inc., New York,
N.Y., a corporation of Delaware
Filed May 15, 1964, Ser. No. 367,716
4 Claims. (Cl. 274—15)

The invention relates to a device to engage and disengage the changing mechanism of a record player comprising a coupling member which is moved by the pick up arm when it reaches the run out groove to within reach of a cam rotating with the turntable. The cam moves the coupling member so that a face provided on it becomes operative as a tooth of a driving wheel connected with the changing mechanism and engages it with a pinion mounted on the turntable.

It is known, to provide a driving wheel in the changing mechanism, having, at a point of its circumference, a gap lacking one or more teeth and a movable tooth or a locking member being provided on the driving wheel for coupling the pinion of the turntable and drive wheel. For coupling the drive wheel and turntable pinion this tooth, or locking member, is swung into an operative position at the beginning of the changing operation. Usually a pinion is used in which a cam projecting over the crown circle of the pinion serves to reject the said locking member, or a similar member, with every rotation of the turntable so long as the pickup arm is still in a sound groove, while the said locking member is taken along and effects the coupling when the pick-up arm is positioned in the run-out groove.

A disadvantage of these known devices is the uncertain friction of a slipping clutch or the similar devices used, which makes the rejection possible, but which must effect the taking along of a swing-in member through a long path to effect the coupling. A further disadvantage is that very different engagement ratios exist between the first contact of the side of the cam until the full engagement of the whole side of the cam occurs as a result of which the feeler side of the cam wears early. In addition, the gear ratio between the cam and the locking member does not correspond to that of the gears to be engaged. As a result of this, difficulties occur during the first engagement of the teeth, because of bad synchronisation, and again a pressure load is created on the edge of the cam. In all cases in which the weight of levers, plates or the like, instead of springs, must effect the required friction, it is disadvantageous that variations in the friction value cannot be avoided which cause a given susceptibility to functional disturbances and which may occur, for example, as a result of dirt, whereas in addition an inclined position of the apparatus has a similar effect.

These difficulties of the known engaging and disengaging devices may be avoided in accordance with the invention. The invention is characterized in that the coupling member which can be shifted on the driving wheel of the changing mechanism, is provided with a feeler which projects into the path of a cam which is mounted on the turntable at a distance from the rotary axis. As is known per se the outer edge of this cam is so formed that during reproduction of a record it prevents coupling by sliding the feeler of the coupling member in one direction, and the inner edge of the cam moves the feeler and thus the coupling member into engaged position when the tone arm reaches the run-out groove. One edge of the coupling member serving as a tooth fully intermeshes with a tooth on the turntable pinion lagging through about 90° with respect to the cam on the turntable and projecting beyond the remaining teeth of the pinion.

So in this case the advantages of the separated function (releasing-coupling) are combined with those of a single system in which the switching tooth also serves as the feeling device.

In order that the invention may readily be carried into effect, an embodiment of the invention will now be described more fully with reference to the accompanying drawings, in which the only parts shown are those required for releasing and coupling the changing mechanism drive wheel, the parts of the changing mechanism attached to the driving wheel being any one of the known arrangements such as shown in U.S. Patent Nos. 2,488,-260, 3,030,115 or 3,129,007.

Figure 1:
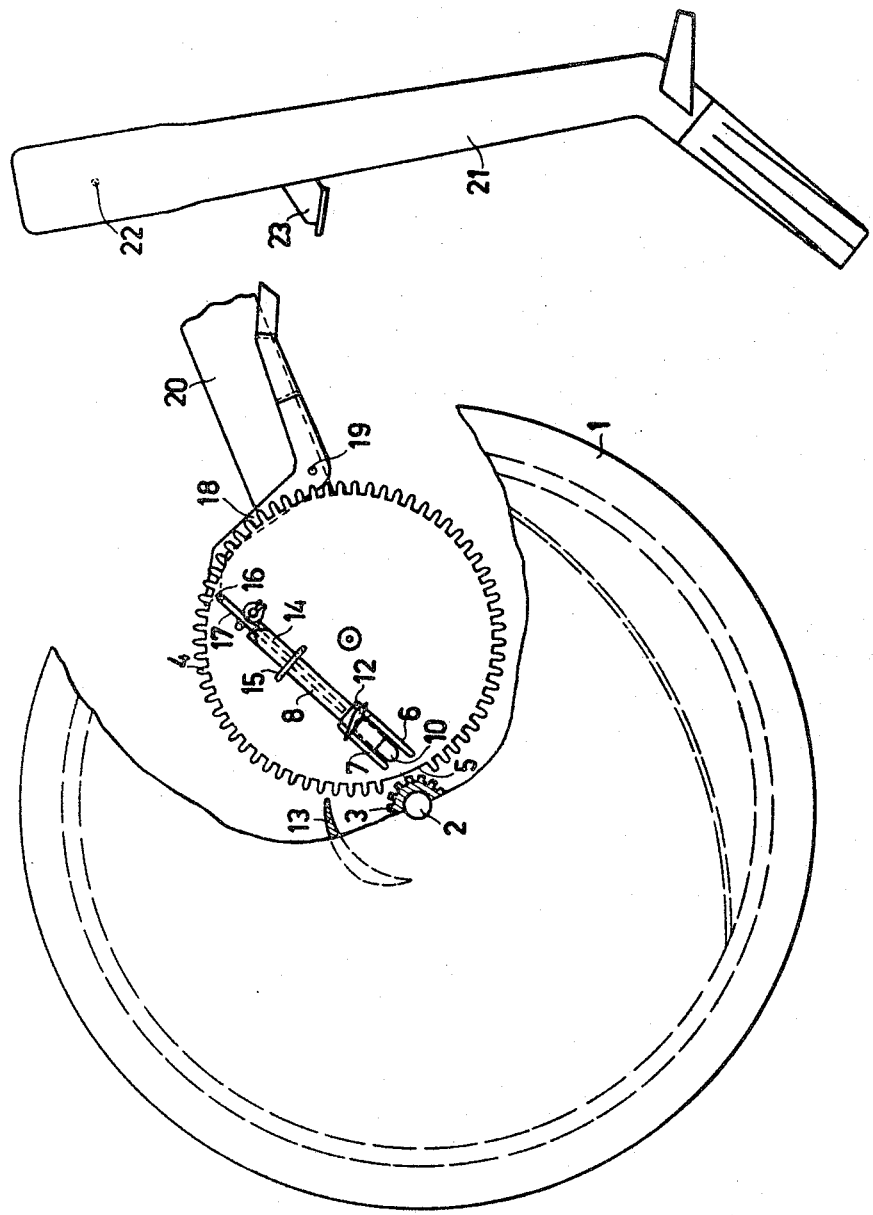
FIGURE 1 shows the releasing and coupling mechanism provided under the turntable, all the parts being in their rest position.

In FIGURE 1 a turntable 1 is shown rotatably mounted on a shaft 2. Its hub is constructed as a pinion 3. One tooth 28 lies in a plane above the driving wheel 4 of the changing mechanism. This driving wheel 4 is in its rest position in FIGURE 1 in which a large gap 5 is opposite to the pinion 3. So in this position the turntable can rotate freely and the drive wheel 4 is immobile.

Figure 7:
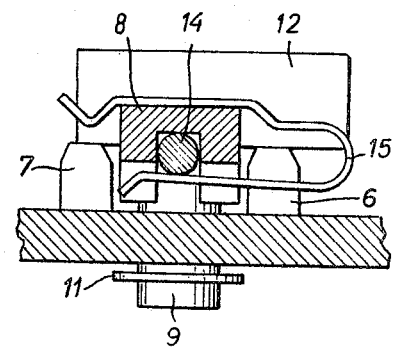
FIGURE 7 shows a cross-section through the guide of the coupling member.

Two guiding strips 6 and 7 are provided on the driving wheel 4 and between them a coupling rod 8 is slideably journalled. The coupling rod 8 is provided with a pivot 9 shown in FIGURE 7 which extends through a slot 10 of the driving wheel 4 and is secured in place by means of a disc 11. The rod 8 has a feeler 12, which projects upwards so as to be capable of cooperating with a cam 13 mounted on the turntable 1 at a distance from the rotary shaft 2. The lower side of rod 8 contains a groove of determined length in which a thin wire rod 14 is journalled. Wire 14 is held in the groove of rod 8 by a spring 15. The free extremity 16 of wire 14 extends through a slot 17 of the driving wheel 4 and can be moved into the so-called run-out position by means of an angle lever 18 which is rotatably mounted at 19. This pivot 19 is mounted on a link 20 of the changing mechanism which is moved during the changing operation via a pin connecting line 20 with the driving wheel 4. The pick-up arm 21 of the record changer is mounted swingably at 22 and comprises a rigidly connected lever 23 which, in the run-out position of the arm 21 bears against the angle lever 18.

Figure 2:
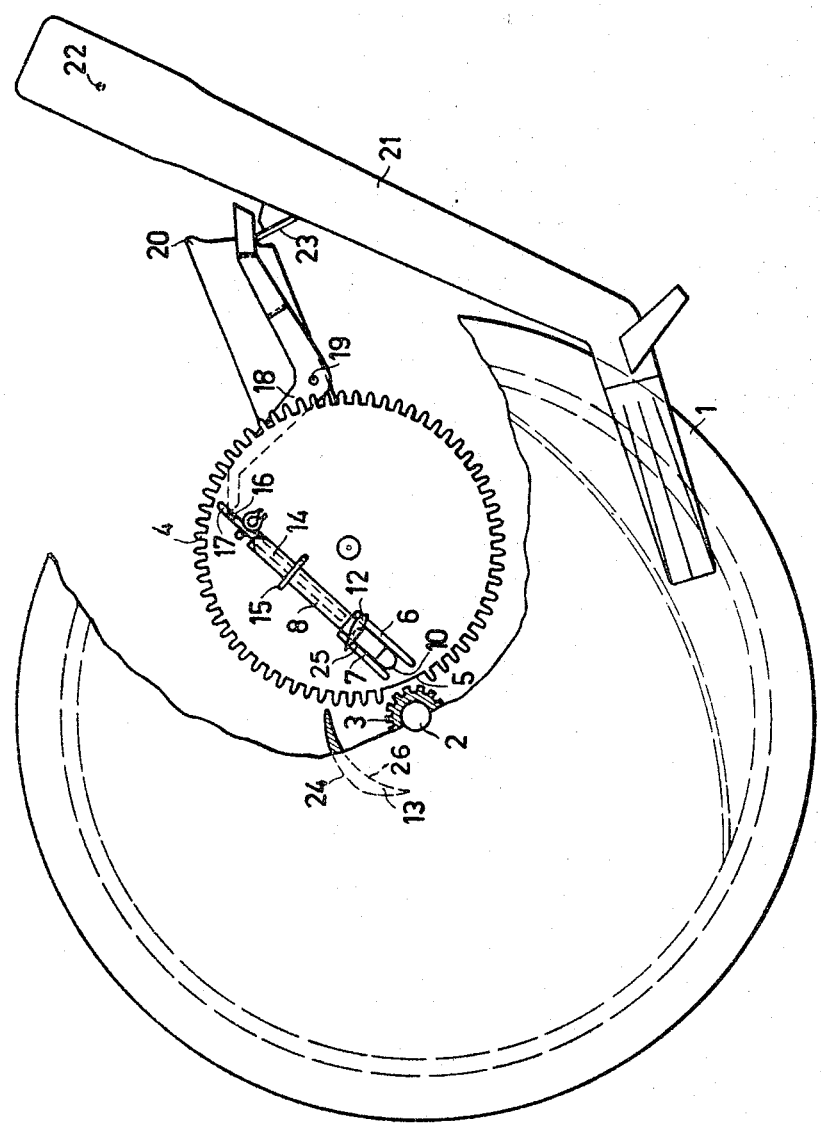
FIGURE 2 shows the same parts in the first stage of the coupling operation, i.e., the so-called sharp position.

FIGURE 2 shows the initial stage of the so-called sharp position of the changing mechanism. The sound grooves of the record have moved the pick-up arm 21 to such an extent that its lever 23 engages the angle lever 18. This lever 18 moves the wire rod 14 a few tenths of a millimeter each rotation of the turntable so that rod 14 at a given moment assumes the position shown in FIG. 2. The rod 8 is moved by wire 14 by the same amount under friction between rod 8 and wire 14 and the face 24 of the cam 13, which has a corresponding radial slope, each revolution acts upon the face 25 of the feeler 12 and therefore moves the rod 8 by the same amount relative to the wire 14.

Figure 3:
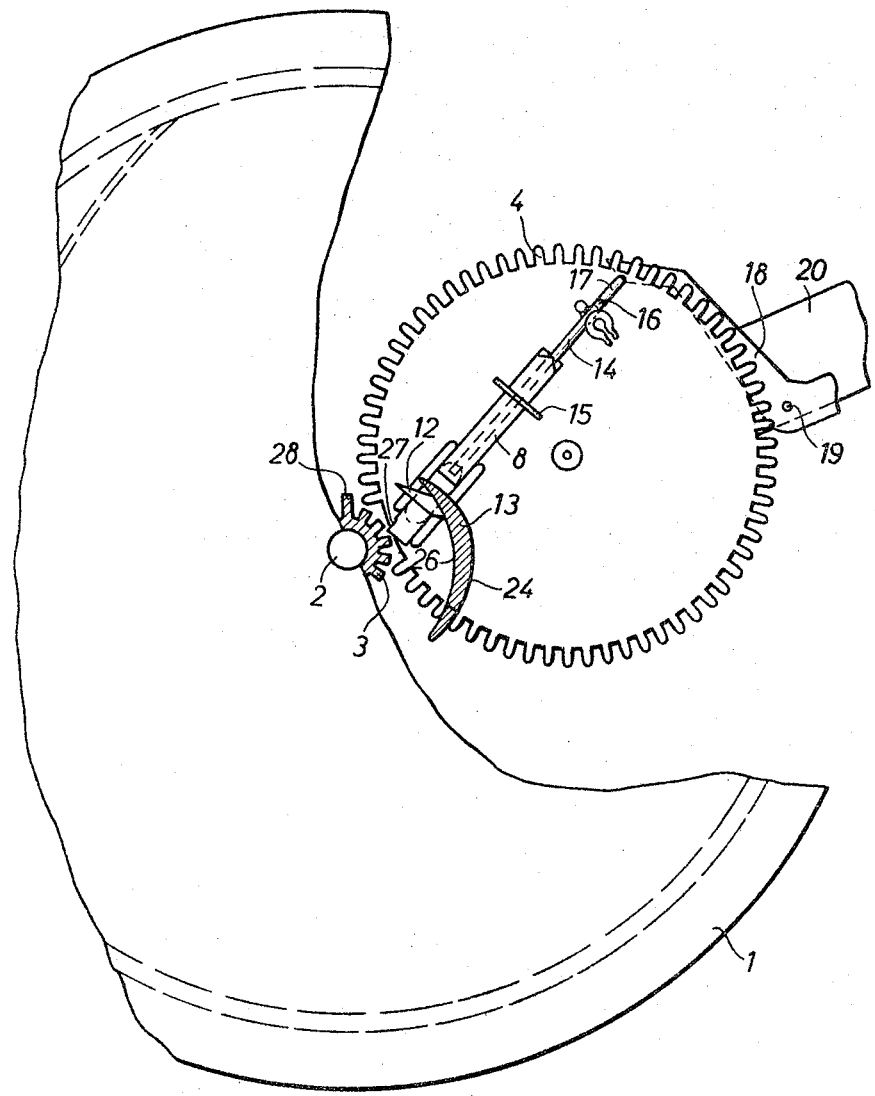
FIGURE 3 shows the device in the position in which the coupling mechanism is positioned for connecting the drive wheel and turntable pinion.

In FIGURE 3 the pick-up arm has run into the run-out groove in which the pitch of the record grooves is larger than the slope of the face 24. Instead of a rejection, or moving rod 8 back of the face 26 of the cam 13 which is curved inwardly at a very much larger pitch catches the feeler 12 so that the disengaged movement of the rod 8 is reached and its second movement as a coupling rod occurs. The front extremity of rod 8 comprises an edge 27 which is formed as a tooth of the driving wheel 4 located in the path of the tooth 28 of the pinion 3 which is angularly displaced approximately 90° with respect to the cam 13 so that the tooth edge 27 of rod 8 is fully in its operative position before it is engaged by the tooth 28.

Figure 4:
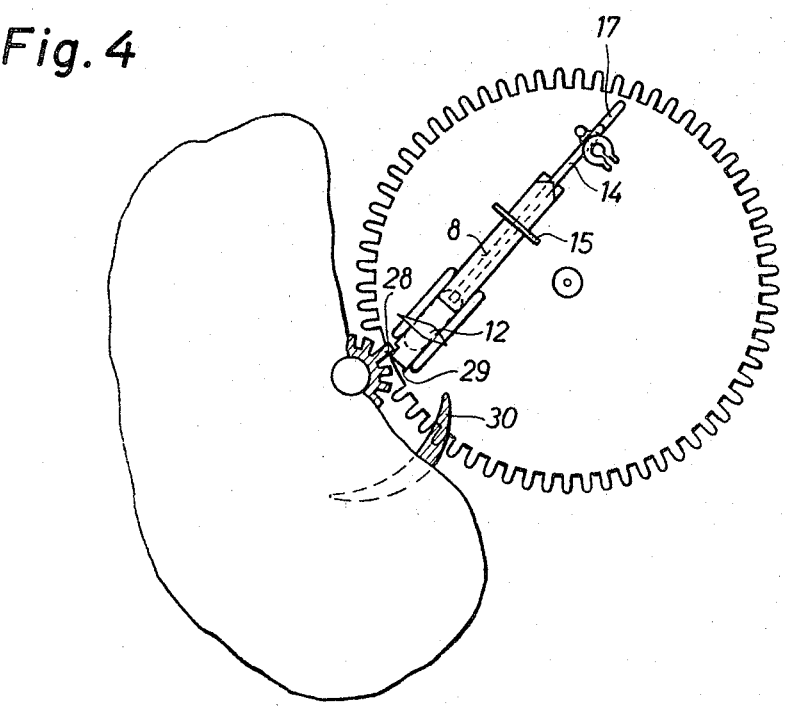
FIGURE 4 shows the device in the position in which the drive wheel and pinion are connected via the coupling member.

This instance is shown in FIGURE 4 i.e. engagement of the tooth 28 with the coupling rod 8. It is noted that by the arrangement above described the drive wheel 4 and pinion 3 are coupled without varying the transmission ratio since tooth 28 and tooth 27 have the same gear ratio. The pressure exerted by the tooth 28 on the coupling member 8 is transferred to the guide bars 6, 7 and further transmitted to the driving wheel 4 which is set in motion and allows the changing operation to be carried out in any suitable known manner.

In case of wanton reverse rotation of the turntable 1, the tooth 28 presses against the face 29 of the rod 8 (FIG. 4) which is inclined so that the tooth can move the rod 8 and the wire rod 14 backwards to such an extent that when the cam 13 on the turntable 1 abuts against a correspondingly inclined edge of the feeler 12, the reverse movement is continued until the rest position of the coupling member is reached. If wire rod 14 reaches the end of the slot 17 at an earlier instant than the pivot 9 of the rod 8 reaches the end of slot 10 relative movement ensues so that each part is returned to its initial position.

Figure 5:
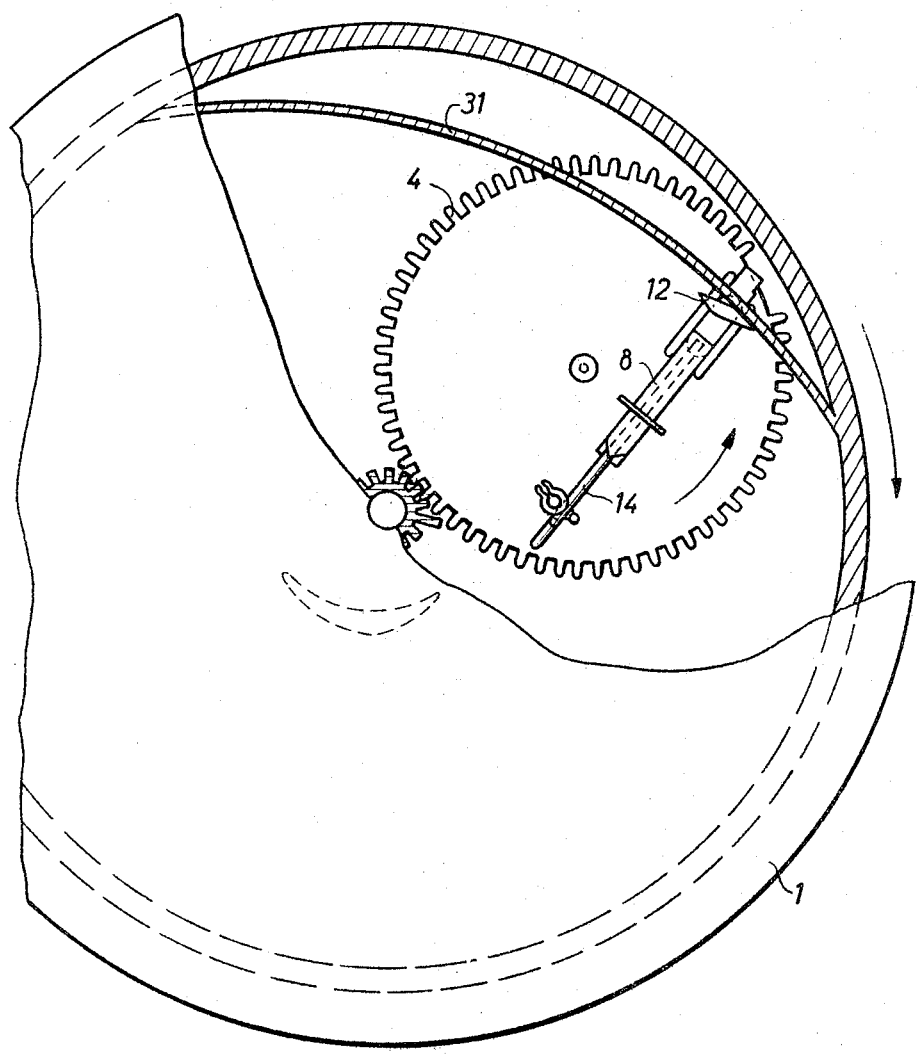
FIGURE 5 shows the beginning of the automatic return of the coupling member by virtue of a rib on the turntable opposite the turntable cam.
Figure 6:
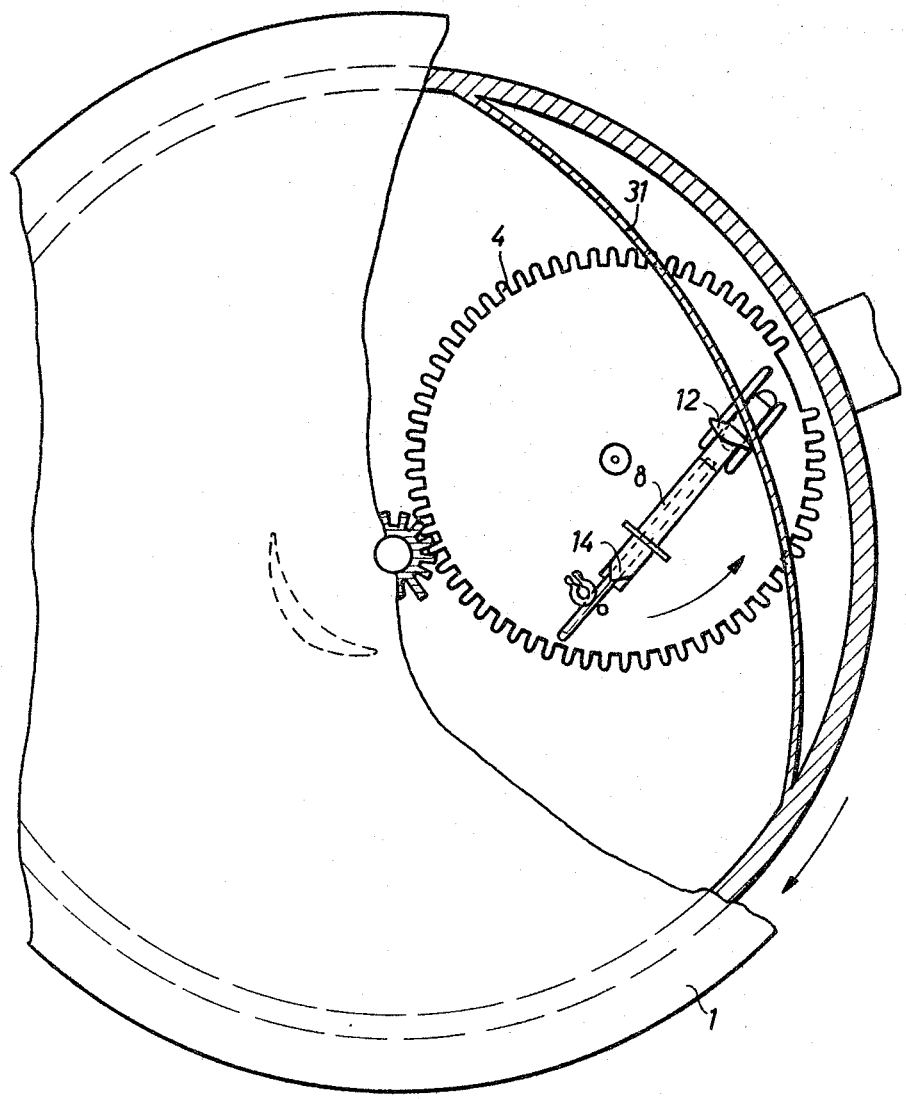
FIGURE 6 shows the end of the returning operation.

In a normal performance of the turntable it rotates in its normal direction and the driving wheel 4 reaches the position shown in FIGURE 5. In this position the driving wheel 4, the feeler 12 of rod 8, meets a curved rib 31 which is provided on the lower side of the turntable opposite to the cam 13. The center of curvature of the said rib lies behind the shaft 2 of the turntable so that the rib 31 approaches the shaft and its height is chosen so that it can come in contact with the feeler 12. Furthermore, the rib curve is established so that it returns the coupling member 8 into its initial position as soon as the driving wheel 4 has performed half a revolution. In the position shown in FIGURE 5, the automatic return of the rod 8 and the wire rod 14 to their rest positions is just beginning and in FIGURE 6 the end of this return movement is shown.

It is noted that the rod 8 and the wire rod 14 consists of particularly light-weight material with a low friction value in order that the effects on the pick-up arm is as small as possible. Suitable materials, for example, are a suitable synthetic material for the rod 8 and polished aluminium wire for the wire rod 14.

What is claimed is:

1. Apparatus for engaging and disengaging the drive wheel of a record changing mechanism and a pinion wheel on the associated phonograph turntable comprising drive wheel means having a toothed periphery and having a gap in the said peripheral teeth thereof, a coupling member, means supporting said coupling member on said drive wheel for lateral sliding movement; said coupling member comprising a pair of rod members, means for frictionally connecting said rod members in telescopic relation, one said rod member having a configured end face adjacent said gap, the other of said rod members having a free end surface adjacent the periphery of said drive wheel for engagement with a lever moveable by the tone arm of the phonograph, said one rod member having an upstanding feeler member integral therewith, discrete cam means on said turntable moveable in a circular path for engaging said feeler member and a curved rib on said turntable for engaging said feeler member, said curved rib being located opposite said cam member, and means on said turntable lagging said cam mean by 90° in the normal direction of rotation of said turntable and projecting into the plane of said gap for engaging said configured end face in an extended position of said one rod member.

2. Apparatus for engaging and disengaging the drive wheel of a record changing mechanism and an associated pinion wheel on a phonograph turntable comprising a drive wheel means having a toothed periphery and having a gap in the said peripheral teeth thereof, a coupling member, means supporting said coupling member on said drive wheel for lateral sliding movement, whereby one end of said coupling member is moved into the vertical plane of said gap, said coupling member having an upstanding feeler member integral therewith, discrete cam means o nsaid turntable moveable in a circular path, means for moving said coupling member for positioning said feeler member in said path; whereby said coupling member is moved by said cam means into an operative position in which said one end of said coupling member is located in the vertical plane defined by said gap, and a curved rib means on said turntable opposite said discrete cam means, for engaging said feeler member and moving said coupling member to a retracted position in which said one end is withdrawn from said vertical plane, and discrete tooth means on said turntable lagging said cam means by 90° in the normal direction of rotation of said turntable for engaging said one end of said coupling member when positioned in said gap for turning said drive wheel into meshed engagement with said associated pinion.

3. Apparatus according to claim 2 wherein said coupling means comprises an elongated member, said one end of said coupling member being configured and positioned on said driving wheel by said supporting means as a tooth thereof when in said vertical plane whereby the gear ratio of said coupling member and said discrete tooth means is identical with the gear ratio of said driving wheel and associated pinion.

4. Apparatus according to claim 3 wherein said means for supporting said coupling member on said driving wheel comprises means defining an elongated slot in said coupling member, a wire rod within said slot, and a lateral spring clip means for frictionally connecting said wire rod and said elongated member, said elongated member having a depending pin receivable in an elongated slot in said driving wheel, and a pair of guide bars each side of said slot defining a channel for slideably receiving said coupling member.

References Cited by the Examiner

UNITED STATES PATENTS

| | | | |
|---|---|---|---|
| 2,613,081 | 10/1952 | Fisher | 274—10 |
| 2,898,114 | 8/1959 | Vistain | 274—10 |
| 3,007,704 | 11/1961 | Erwood | 274—10 |
| 3,218,078 | 11/1965 | Freier | 274—10 |

NORTON ANSHER, *Primary Examiner.*

C. B. PRICE, *Assistant Examiner.*